(12) United States Patent
Dunlap

(10) Patent No.: US 10,483,739 B1
(45) Date of Patent: Nov. 19, 2019

(54) TEMPORARY WIRING PORTAL ASSEMBLY

(71) Applicant: Matthew Dunlap, Maryville, TN (US)

(72) Inventor: Matthew Dunlap, Maryville, TN (US)

( * ) Notice: Subject to any disclaimer, the term of this patent is extended or adjusted under 35 U.S.C. 154(b) by 0 days.

(21) Appl. No.: 16/135,057

(22) Filed: Sep. 19, 2018

(51) Int. Cl.
*H02G 3/08* (2006.01)
*F16L 3/015* (2006.01)
*H02G 3/38* (2006.01)
*H02G 3/22* (2006.01)

(52) U.S. Cl.
CPC .............. *H02G 3/083* (2013.01); *F16L 3/015* (2013.01); *H02G 3/22* (2013.01); *H02G 3/386* (2013.01)

(58) Field of Classification Search
CPC .......... H02G 3/083; H02G 3/08; H02G 3/081; H02G 3/10; H02G 3/12; H02G 3/121; H02G 3/18; H02G 3/22; H02G 3/26; H02G 3/36; H05K 5/00; H05K 5/02; H05K 5/0204; H05K 5/0217; H05K 5/0247; H01R 13/46; H01R 13/53; F16L 3/015; F16L 3/00
USPC ....... 174/50, 53, 57, 58, 480, 481, 503, 520, 174/535, 60, 61, 62, 63, 64; 220/3.2–3.9, 220/4.02; 33/529, 645; 52/220.1, 220.8
See application file for complete search history.

(56) References Cited

U.S. PATENT DOCUMENTS

| | | | | |
|---|---|---|---|---|
| 1,650,233 A | * | 11/1927 | Plunkett | H02G 3/0616 |
| | | | | 174/541 |
| 4,096,964 A | * | 6/1978 | Glick | H02G 3/12 |
| | | | | 220/3.4 |
| 4,667,840 A | * | 5/1987 | Lindsey | H02G 3/088 |
| | | | | 174/504 |
| 5,700,977 A | * | 12/1997 | Ford | H02B 1/202 |
| | | | | 174/64 |
| 6,012,685 A | | 1/2000 | Saraceno, Jr. | |
| 7,109,416 B1 | * | 9/2006 | Reed | H02G 15/113 |
| | | | | 174/481 |
| 7,219,863 B1 | | 5/2007 | Collett, II | |
| 7,312,407 B2 | * | 12/2007 | Case | H02G 3/06 |
| | | | | 174/135 |
| 7,323,637 B2 | * | 1/2008 | Tideback | H02G 1/08 |
| | | | | 174/50 |
| 7,427,714 B1 | * | 9/2008 | Lammens, Jr. | H02G 3/088 |
| | | | | 174/53 |
| 7,435,905 B1 | * | 10/2008 | Elder | H02G 3/081 |
| | | | | 174/92 |
| 7,568,665 B2 | | 8/2009 | Corbin | |
| 7,915,542 B2 | | 3/2011 | Forbis | |

(Continued)

*Primary Examiner* — Angel R Estrada

(57) ABSTRACT

A temporary wiring portal assembly includes a wall stud that has a lateral surface and a front surface, and drywall is positioned on the front surface. A junction box is removably fastened to the wall stud prior to installing drywall. The junction box has an input port and an output port, and a conductor is routed into the input port and out of the output port. A tube is removably coupled to the output port and the tube has a length of at least 10.0 cm. Thus, the tube extends outwardly beyond the front surface of the wall stud when the junction box is removably fastened to the wall stud. The tube requires the drywall be installed around the tube when the drywall is fastened to the front surface of the wall stud thereby inhibiting the conductor from being covered by the drywall. Moreover, the tube is removed from the output port when the drywall is installed thereby facilitating the conductor to be accessible for trim installation.

4 Claims, 5 Drawing Sheets

(56) References Cited

U.S. PATENT DOCUMENTS

| | | |
|---|---|---|
| 8,191,323 B2 | 6/2012 | Turner |
| 8,376,411 B2 * | 2/2013 | Newby ................ F16L 55/172 174/50 |
| D722,977 S | 2/2015 | Hagarty |
| 9,010,696 B2 | 4/2015 | Siddiqui |
| 9,419,420 B1 * | 8/2016 | Parrish .................... H02G 3/06 |

* cited by examiner

TEMPORARY WIRING PORTAL ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to portal devices and more particularly pertains to a new portal device for inhibiting conductors from being inadvertently covered by drywall during new construction.

BRIEF SUMMARY OF THE INVENTION

An embodiment of the disclosure meets the needs presented above by generally comprising a wall stud that has a lateral surface and a front surface, and drywall is positioned on the front surface. A junction box is removably fastened to the wall stud prior to installing drywall. The junction box has an input port and an output port, and a conductor is routed into the input port and out of the output port. A tube is removably coupled to the output port and the tube has a length of at least 10.0 cm. Thus, the tube extends outwardly beyond the front surface of the wall stud when the junction box is removably fastened to the wall stud. The tube requires the drywall be installed around the tube when the drywall is fastened to the front surface of the wall stud thereby inhibiting the conductor from being covered by the drywall. Moreover, the tube is removed from the output port when the drywall is installed thereby facilitating the conductor to be accessible for trim installation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
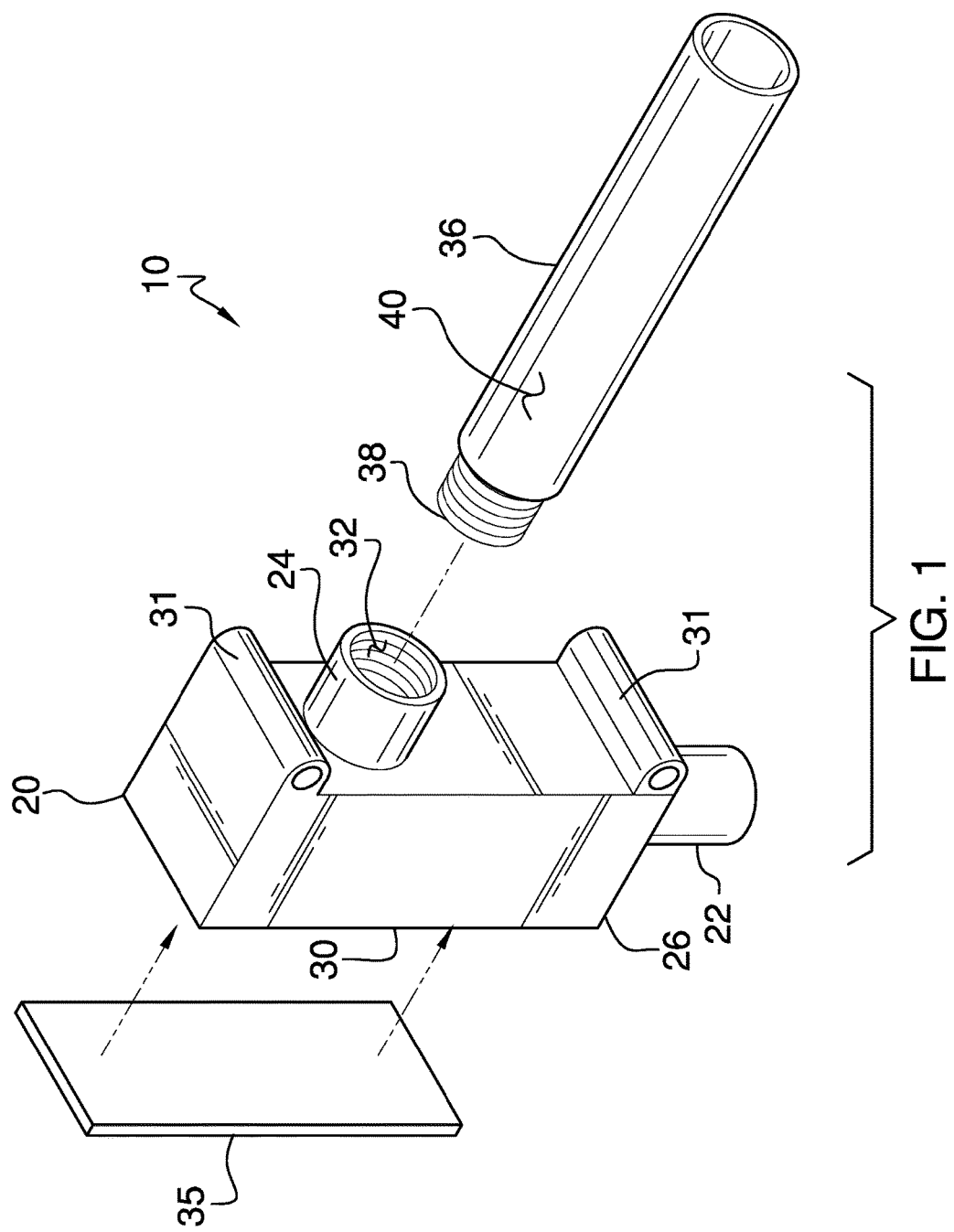
FIG. 1 is an exploded perspective view of a temporary wiring portal assembly according to an embodiment of the disclosure.
Figure 2:
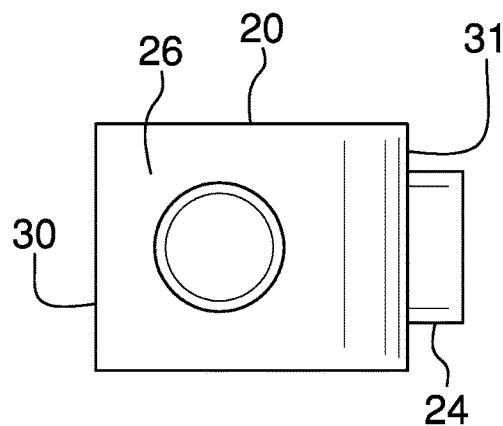
FIG. 2 is a bottom view of an embodiment of the disclosure.
Figure 3:
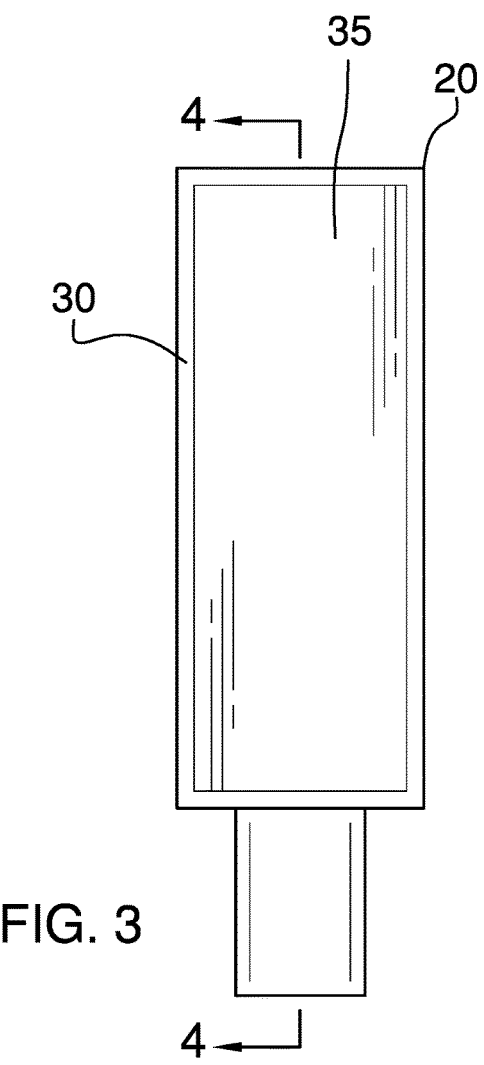
FIG. 3 is a back view of an embodiment of the disclosure.
Figure 4:
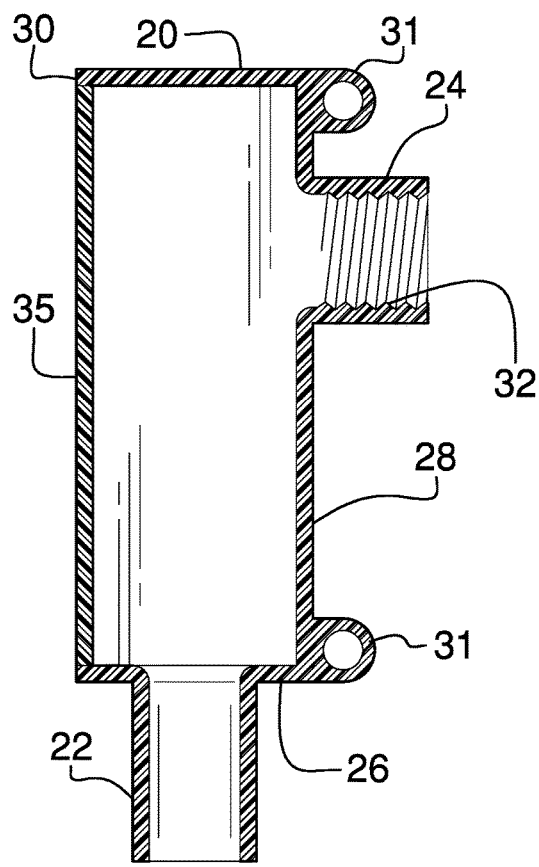
FIG. 4 is a cross sectional view taken along line 4-4 of FIG. 3 of an embodiment of the disclosure.
Figure 5:
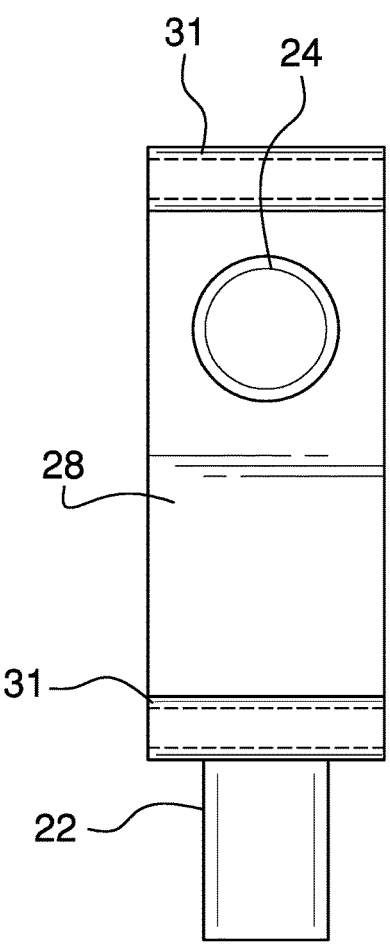
FIG. 5 is a front view of an embodiment of the disclosure.
Figure 6:
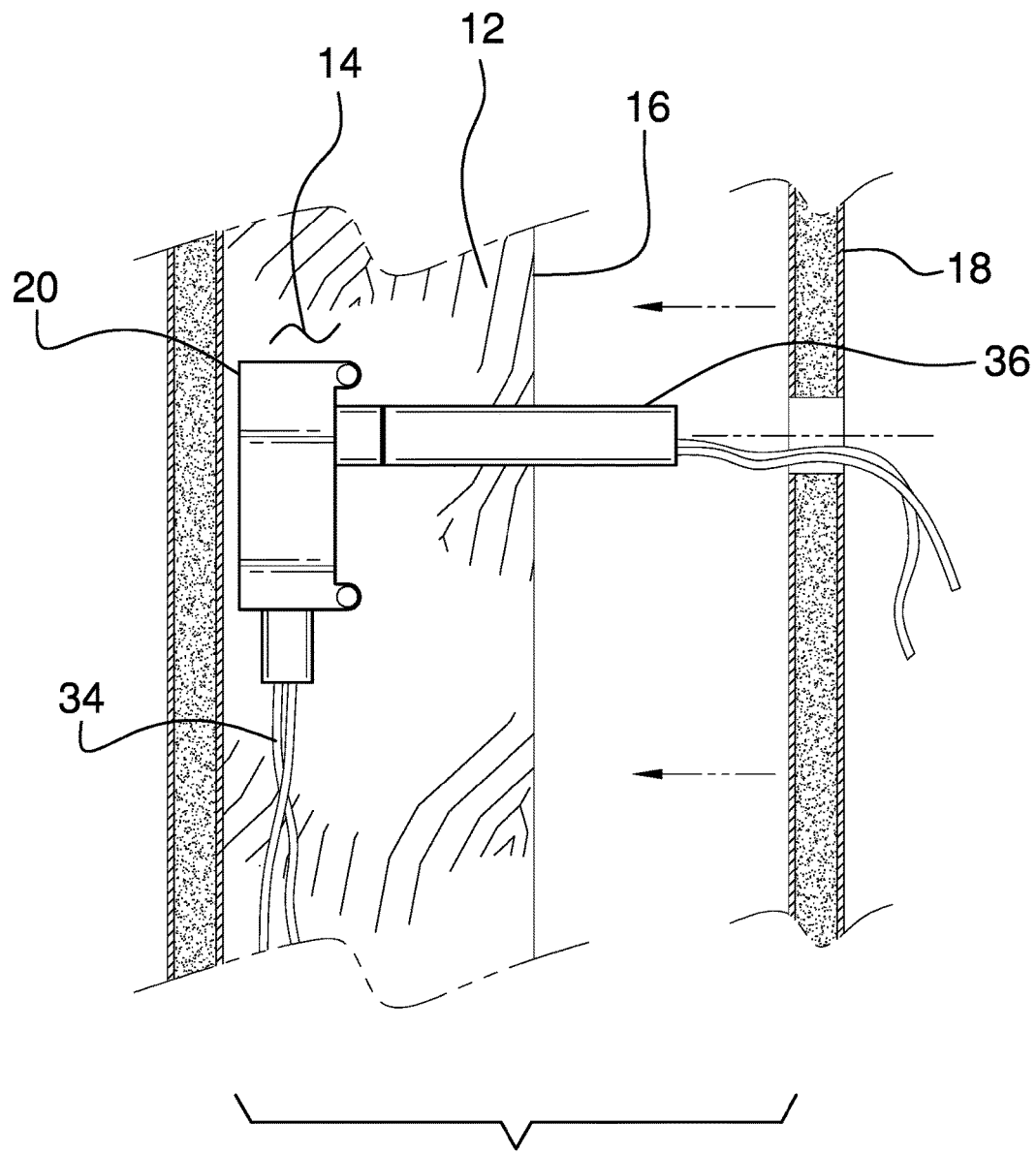
FIG. 6 is a perspective in-use view of an embodiment of the disclosure showing drywall being positioned on a wall stud.
Figure 7:
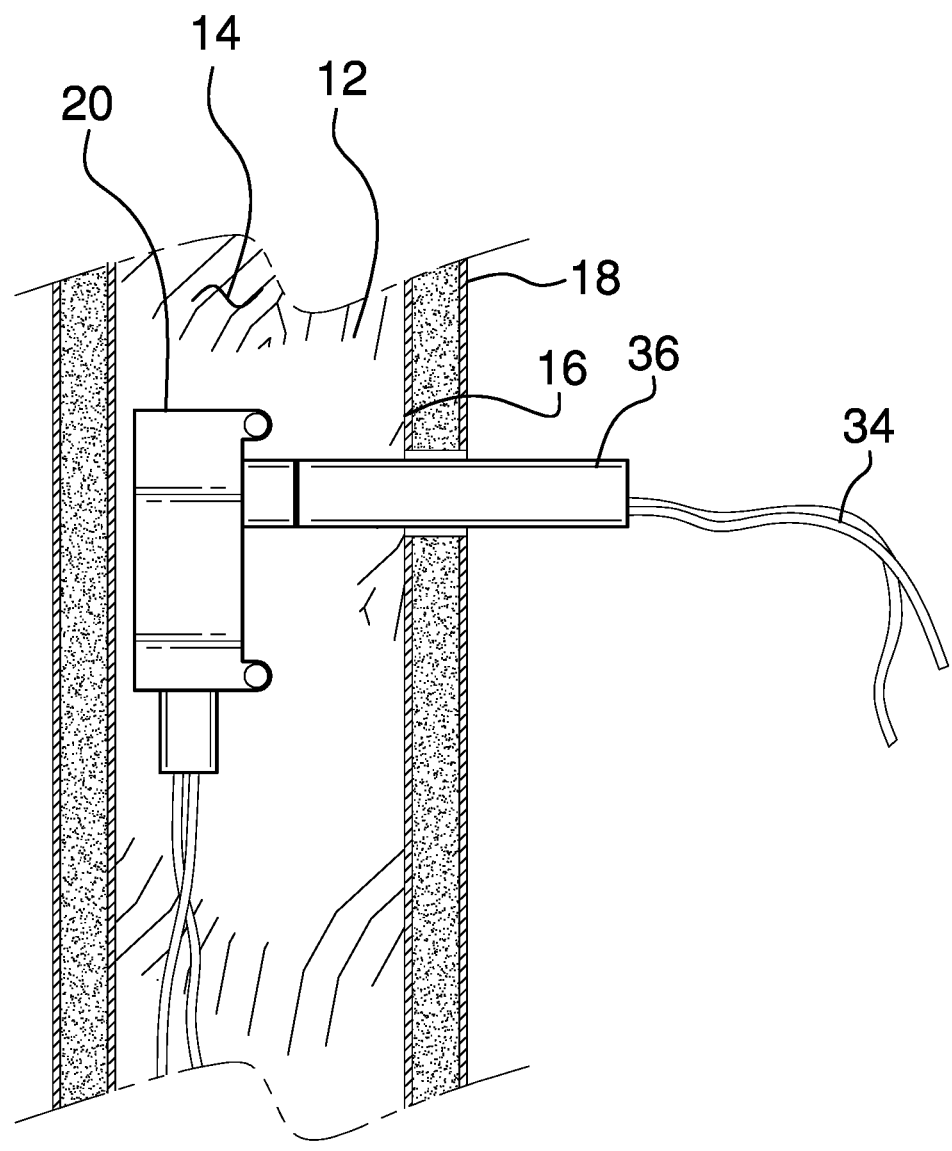
FIG. 7 is a perspective in-use view of an embodiment of the disclosure showing a tube extending through drywall.

With reference now to the drawings, and in particular to FIGS. 1 through 7 thereof, a new portal device embodying the principles and concepts of an embodiment of the disclosure and generally designated by the reference numeral 10 will be described.

As best illustrated in FIGS. 1 through 7, the temporary wiring portal assembly 10 generally comprises a wall stud 12 that has a lateral surface 14 and a front surface 16, and the front surface 16 has drywall 18 positioned thereon. The wall stud 12 may be a wood stud, a metal stud or any other type of framing member commonly found in residential and commercial construction. A junction box 20 is provided and the junction box 20 is removably fastened to the wall stud 12 prior to installing drywall 18. The junction box 20 has an input port 22, an output port 24, a lower wall 26, a front wall 28 and a back side 30. The back side 30 is open to access an interior of the junction box 20, the input port 22 extends through the lower wall 26 and the output port 24 extends through the front wall 28. The junction box 20 includes a pair of nailing tubes 31 that each extends laterally across the front wall 28. A nail or the like may be extended through each of the nailing tubes 31 to engage the wall stud 12 for retaining the junction box 20 on the wall stud 12.

The output port 24 has an inside surface 32 and the inside surface 32 is threaded. The junction box 20 is positioned on the wall stud 12 having the input port 22 extending downwardly and having the output port 24 extending toward the front surface 16 of the wall stud 12. A conductor 34, such as electrical wiring for a light switch, a communication conductor and any other conductor 34 commonly found in new construction of a building, is routed into the input port 22 and out of the output port 24. Each of the input 22 and output 24 ports may comprise tubes that each extend away from the junction box 20. A cover 35 is removably coupled to the back side 30 of the junction box 20 for closing the back side 30.

A tube 36 is provided, the tube 36 is removably coupled to the output port 24 and the tube 36 has a length of at least 10.0 cm and no more than 20.0 cm. Thus, the tube 36 extends outwardly beyond the front surface 16 of the wall stud 12 when the junction box 20 is removably fastened to the wall stud 12. The tube 36 requires the drywall 18 be installed around the tube 36 when the drywall 18 is fastened to the front surface 16 of the wall stud 12. In this way the tube 36 inhibits the conductor 34 from being inadvertently covered by the drywall 18 when the drywall 18 is installed. Additionally, the tube 36 is removed from the output port 24 when the drywall 18 is installed thereby facilitating the conductor 34 to be accessible for trim installation. The tube 36 has a first end 38 and an outer surface 40 and the outer surface 40 is threaded adjacent to the first end 38. The output port 24 insertably receives the first end 38 of the tube 36 and the outer surface 40 threadably engages the inside surface 32 of the output port 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A temporary wiring portal assembly being configured to inhibit finish wiring from being covered during drywall installation, said assembly comprising:
   a wall stud having a lateral surface and a front surface, said front surface having drywall being positioned thereon;
   a junction box being removably fastened to said wall stud prior to installing drywall, said junction box having an input port and an output port, said junction box having a conductor extending into said input port and out of said output port; and
   a tube being removably coupled to said output port, said tube having a length of at least 10.0 cm such that said tube extends outwardly beyond said front surface of said wall stud when said junction box is removably fastened to said wall stud, said tube requiring the drywall be installed around said tube when the drywall is fastened to said front surface of said wall stud thereby inhibiting the conductor from being covered by the drywall, wherein said tube is removed from said output port when the drywall is installed thereby facilitating the conductor to be accessible for trim installation.

2. The assembly according to claim 1, wherein:
   said junction box has a lower wall, a front wall and a back side, said back side being open to access an interior of said junction box, said input port extending through said lower wall, said output port extending through said front wall;
   said output port has an inside surface, said inside surface being threaded; and
   said junction box is positioned on said lateral surface of said wall stud having said input port extending downwardly and having said output port extending toward said front surface of said wall stud.

3. The assembly according to claim 1, wherein said tube has a first end and an outer surface, said outer surface being threaded adjacent to said first end, said output port insertably receiving said first end of said tube having said outer surface threadably engaging an inside surface of said output port.

4. A temporary wiring portal assembly being configured to inhibit finish wiring from being covered during drywall installation, said assembly comprising:
   a wall stud having a lateral surface and a front surface, said front surface having drywall being positioned thereon;
   a junction box being removably fastened to said wall stud prior to installing drywall, said junction box having an input port and an output port, said junction box having a lower wall, a front wall and a back side, said back side being open to access an interior of said junction box, said input port extending through said lower wall, said output port extending through said front wall, said output port having an inside surface, said inside surface being threaded, said junction box being positioned on said wall stud having said input port extending downwardly and having said output port extending toward said front surface of said wall stud, said junction box having a conductor extending into said input port and out of said output port; and
   a tube being removably coupled to said output port, said tube having a length of at least 10.0 cm such that said tube extends outwardly beyond said front surface of said wall stud when said junction box is removably fastened to said wall stud, said tube requiring the drywall be installed around said tube when the drywall is fastened to said front surface of said wall stud thereby inhibiting the conductor from being covered by the drywall, wherein said tube is removed from said output port when the drywall is installed thereby facilitating the conductor to be accessible for trim installation, said tube having a first end and an outer surface, said outer surface being threaded adjacent to said first end, said output port insertably receiving said first end of said tube having said outer surface threadably engaging said inside surface of said output port.

* * * * *